(12) United States Patent
Talegaonkar et al.

(10) Patent No.: US 11,650,618 B2
(45) Date of Patent: *May 16, 2023

(54) REFERENCELESS FREQUENCY ACQUISITION

(71) Applicant: SITRUS TECHNOLOGY CORPORATION, Shanghai (CN)

(72) Inventors: Mrunmay Talegaonkar, Irvine, CA (US); Michael Q. Le, Laguna Niguel, CA (US)

(73) Assignee: SITRUS TECHNOLOGY CORPORATION, Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/567,860

(22) Filed: Jan. 3, 2022

(65) Prior Publication Data

US 2022/0300029 A1 Sep. 22, 2022

Related U.S. Application Data

(63) Continuation of application No. 17/207,669, filed on Mar. 20, 2021, now Pat. No. 11,216,024.

(51) Int. Cl.
*G06F 1/10* (2006.01)
*G06F 1/08* (2006.01)

(52) U.S. Cl.
CPC . *G06F 1/08* (2013.01); *G06F 1/10* (2013.01)

(58) Field of Classification Search
CPC ..................................... G06F 1/10; G06F 1/08
See application file for complete search history.

(56) References Cited

U.S. PATENT DOCUMENTS 4,460,860 A * 7/1984 Schwesig ................ H02P 25/03
318/722
4,498,129 A * 2/1985 Velazquez .......... G11B 20/1217
360/77.02

(Continued)

OTHER PUBLICATIONS

Huang, Sui, et al. "An 8.2 Gb/s-to-10.3 Gb/s Full-Rate linear Referenceless CDR Without Frequency Detector in 0.18 mm CMOS," IEEE Journal of Solid-State Circuits, vol. 50, No. 9, Sep. 2015, pp. 2048-2060.

(Continued)

*Primary Examiner* — Phil K Nguyen
(74) *Attorney, Agent, or Firm* — Hauptman Ham, LLP

(57) ABSTRACT

A referenceless frequency acquisition scheme locks to an unknown data frequency by feedback of sampled data to a digitally controlled oscillator (DCO). A received data signal is converted to deserialized outputs, then by a phase detector to symbol streams of phase updates. Each symbol stream is converted to a lower rate sum, for which absolute values are computed and periodically summed. Absolute value sums are obtained for each frequency over a range of test frequencies to obtain totals, each corresponding to a different test frequency. A critical value is determined from among the totals. The DCO is set to the test frequency corresponding to the critical value as a coarse approximation for the unknown frequency. In subsequent iterations, proportional feedback to the DCO of lower rate sums of symbol streams is combined with integral feedback of codes representing finer approximations of the unknown data frequency swept over successively narrowing bands, and the DCO is locked to the finest approximation that lies between consecutive codes corresponding to sums having opposite signs.

8 Claims, 14 Drawing Sheets

(56) References Cited

U.S. PATENT DOCUMENTS

| | | | |
|---|---|---|---|
| 5,107,079 A * | 4/1992 | Hoendervoogt | G06F 3/046 |
| | | | 178/20.02 |
| 7,298,294 B1 | 11/2007 | Oberg et al. | |
| 7,760,825 B2 | 7/2010 | Alcouffe | |
| 8,724,441 B2 | 5/2014 | Higashino | |
| 10,666,490 B1 | 5/2020 | Koopmann | |
| 2003/0165209 A1* | 9/2003 | Chen | H03L 7/18 |
| | | | 375/376 |
| 2007/0147558 A1 | 6/2007 | Hsiung et al. | |
| 2008/0069271 A1 | 3/2008 | Lennen | |
| 2009/0092401 A1 | 4/2009 | Sekine et al. | |
| 2009/0196389 A1 | 8/2009 | Yamashita | |
| 2013/0243056 A1 | 9/2013 | Chmelar et al. | |
| 2015/0069225 A1* | 3/2015 | Kim | G01D 5/34707 |
| | | | 250/231.1 |

OTHER PUBLICATIONS

Perrott, Michael, et al. "A 2.5-Gb/s Multi-Rate 0.25-mm CMOS Clock and Data Recovery Circuit Utilizing a Hybrid Analog/Digital Loop Filter and All-Digital Referenceless Frequency Acquisition," IEEE Journal of Solid State Circuits, vol. 41, No. 12, Dec. 2006, pp. 2930-2944.

Shu, Guanghua, et al. "A 4-to-10.5 Gb/s Continuous-Rate Digital Clock and Data Recovery with Automatic Frequency Acquisition," IEEE Journal of Solid-State Circuits, vol. 51, No. 2, Feb. 2016, pp. 428-439.

* cited by examiner

REFERENCELESS FREQUENCY ACQUISITION

CROSS-REFERENCE TO RELATED APPLICATIONS

This application is a continuation of, and claims priority to, U.S. application Ser. No. 17/207,669 that was filed on Mar. 20, 2021 and which is fully incorporated herein by reference.

BACKGROUND OF THE INVENTION

Field of the Invention

The present invention relates generally to digital communication systems, and more specifically to a scheme for referenceless frequency acquisition in a clock and data recovery circuit, with particular application in NRZ and PAM4 receivers.

Description of Related Art

Conventional digital communication systems use an NRZ (PAM2) scheme to modulate signals so that bits of information are represented by one of two possible signal levels that correspond to a binary 0 or 1. To increase the bit rate, the PAM4 scheme has been proposed to modulate signals so that bits are represented by one of four possible signal levels corresponding to binary 00, 01, 10 or 11. The PAM4 scheme thus effectively doubles the bit rate in serial data transmissions by increasing the number of levels of pulse-amplitude modulation.

When an NRZ or PAM4 receiver receives random data having an unknown data frequency, a clock and data recovery (CDR) circuit is needed to determine the correct sampling phase for the incoming data signal. The receiver clock frequency needs to be very close to the incoming data frequency to ensure accurate sampling and to enable the CDR loop to lock. Known solutions use an external reference clock with a phase lock loop (PLL) to determine the input data frequency so that sampling can be synchronized for optimal data recovery.

The ideal timing for sampling is illustrated in the eye diagram of FIG. 1, which shows superimposed data signals having magnitudes that vary along the vertical axis from 0 to 1. Instances of a clock sampling point are shown along the horizontal. When clock frequency, $F_{clk}$, is not equal to the data frequency, $F_{data}$, the sampling point traverses the data eye in one of the directions shown. That is, when data frequency is less than clock frequency, the sampling point traverses to the left, and when data frequency is greater than clock frequency, the sampling point traverses to the right. The rate of data eye traversal depends on the absolute frequency difference, or error, between data and clock, often expressed in parts per million (ppm). As the sampling point passes to the left-hand side or right-hand side of the data eye, where the contours of the waveform are rising or falling to intermediate levels between 0 and 1, error is introduced in the sampled signal. Thus, when the sampling point is nearer to the middle of the data eye, the signal is read more accurately, with the ideal sampling point and greatest accuracy occurring at the midpoint 10 of the data eye.

Existing solutions for CDR often use a special type of frequency acquisition loop with phase and frequency detection to lock to the incoming data phase. This approach requires that the data frequency be initially relatively close to the clock frequency. Typically, the ability of the CDR loop to lock to the data frequency is limited to situations where the error between clock and data frequencies is within a narrow range of about 100 ppm. These solutions therefore rely on prior knowledge of the data frequency and use an external reference clock signal whose frequency is close to the data frequency, for example, to tune a voltage-controlled oscillator (VCO). The frequency acquisition loop first locks the VCO frequency to an external reference frequency, then switches to acquire a loop control signal from the phase detection (PD) circuit coupled to the incoming data signal.

Reliance on an external reference signal, however, has its drawbacks. At the system level, the reference signal must be provided by a separate circuit equipped, for example, with a crystal oscillator and other components needed to ensure highly accurate and stable frequency. This adds to overall area, complexity and manufacturing costs of the system, while resulting in greater power consumption during usage. Some alternative solutions replace the reference clock with a frequency detector circuit that can detect when VCO frequency closely approaches the data frequency, then similarly switch control to a frequency acquisition loop for phase locking. But because the frequency detector circuit must operate close to the data frequency, it also consumes significant power, roughly doubling the power consumption of the CDR circuit. An additional drawback of the frequency detector circuit is its reliance on detecting clear 0 to 1 transition in an NRZ scheme, which renders it largely ineffective for use with PAM4 modulation where level transitions do not always cross the midpoint.

What is needed is a low-power solution for CDR that is suitable for use with PAM4 modulation.

SUMMARY OF THE INVENTION

The foregoing objectives are achieved by apparatus and methods according to the invention for referenceless frequency acquisition. Such apparatus and methods disclosed herein allow a receiver to lock onto an incoming data signal of unknown frequency without reliance on power-hungry external reference clocks or frequency detection circuits. The invention advantageously provides a purely digital solution that does not require additional clock phases and that does not place any additional constraints on receiver analog front-end (AFE) implementation.

A method according to the invention for referenceless frequency acquisition in a clock and data recovery system may be achieved by executing a series of steps by digital signal processing. In one embodiment, the following steps are executed: (a) receiving a data signal having an unknown data frequency, (b) deserializing the data signal by sampling at a test clock frequency to generate N parallel signal streams, where each signal stream consists of a series of symbol pulses, and where the test clock frequency is set by a digitally controlled oscillator (DCO), and (c) converting the N parallel signal streams into N parallel symbol streams that indicate the sign of the required phase update for the DCO. Then, (d) periodically summing the N parallel symbol streams to generate digital sums, (e) determining an absolute value for each of the digital sums, (f) accumulating the absolute values for a preset number of clock cycles, and (g) recording a total value representing a sum of the absolute values accumulated during the preset number of clock cycles at the test clock frequency. Then, (h) repeating steps (a) through (g) for a plurality of test clock frequencies over a first range of frequencies to obtain a first plurality of total values each corresponding to a different one of the test clock frequencies, (i) determining a first critical value among the first plurality of total values, and (j) setting the DCO to the test clock frequency that corresponds to the first critical value as a first approximation for the unknown data frequency.

In another embodiment, the foregoing method may include additional steps for achieving a finer approximation for the unknown data frequency. The additional steps may be executed in the following order: (k) transmitting codes representing the digital sums to the DCO in a first feedback path, (l) repeating steps (a) through (g) for a second plurality of test clock frequencies over a second range of frequencies that includes the test clock frequency that corresponds to the first critical value to obtain a second plurality of total values each corresponding to a different test clock frequency in the second range, (m) determining a second critical value among the second plurality of total values, and (n) setting the DCO to the test clock frequency that corresponds to the second critical value as a second approximation for the unknown data frequency. Another implementation may include additional steps for transmitting a code through a second feedback path, and adding the codes representing the digital sums to the code transmitted through the second feedback path as combined feedback to the DCO.

In another embodiment, the invention may include additional steps for further improving the frequency estimate and locking a receiver to the unknown data frequency. These additional steps include: (o) setting the DCO to the test clock frequency that corresponds to the second critical value, (p) transmitting, through a second feedback path to the DCO, variable code representing a third plurality of test clock frequencies over a third range of frequencies, (q) adding the codes representing the digital sums to the variable code transmitted through the second feedback path as combined feedback to the DCO, (r) repeating steps (a), (b), (c), (d) and (g) to obtain a third plurality of total values each corresponding to a different test clock frequency among the third plurality of test clock frequencies, and (s) locking the DCO to the data frequency based on the third plurality of total values.

A system according to the invention is also disclosed for referenceless frequency acquisition in a clock and data recovery system. In one embodiment, the system includes a DCO, a receiver, a phase detector, summing stages, a feedback loop, and control logic. The DCO is configured with a coarse tuning input and a feedback input, and provides a clock frequency for the system. The receiver receives a data signal of unknown frequency and converts the data signal into N deserialized outputs. The phase detector converts the N deserialized outputs into N symbol streams each consisting of a series of phase updates. A first summing stage periodically sums together the N symbol streams to generate a lower rate sum. An absolute value stage receives lower rate sums from the first summing state and computes an absolute value for each lower rate sum generated by the first summing stage. A second summing stage periodically sums absolute values computed by the absolute value stage. The feedback loop includes a proportional feedback path and an integral feedback path. Both feedback paths are coupled between a third summing stage and the output of the first summing stage. The third summing stage combines signals from both feedback paths and couples the combined feedback signal to the feedback input. The control logic is configured to (a) enable and bypass the absolute value stage, (b) connect and disconnect the proportional feedback path, (c) disconnect and drive the integral feedback path, (e) store and compare sums generated by the second summing stage, and (f) command the DCO to set a clock frequency.

In a more elaborate embodiment of the system, the control logic may be further configured to perform the following functions: (g) obtain a coarse estimate of the unknown data frequency by disconnecting the proportional feedback path, driving the integral feedback path with a fixed code, commanding the DCO to apply a first range of test clock frequencies to the system, and determining the coarse estimate as code corresponding to a first critical output of the second summing stage, (h) obtain a fine estimate of the unknown data frequency by reconnecting the proportional feedback path, driving the integral feedback path with a fixed code, commanding the DCO to apply a second range of test clock frequencies to the system, where the second range includes the coarse estimate, and determining the fine estimate as code corresponding to a second critical output of the second summing stage, and (i) lock the clock frequency to the data frequency by applying the fine estimate to the feedback input, bypassing the absolute value stage, driving the integral feedback path with a third range of test clock frequencies, and setting the clock frequency to the test clock frequency corresponding to a third critical output of the second summing stage.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features of the invention. Dimensions shown are exemplary only. In the drawings, like reference numerals may designate like parts throughout the different views, wherein:

DETAILED DESCRIPTION OF THE INVENTION

The following disclosure presents apparatus and methods according to the invention for referenceless frequency acquisition. Such apparatus and methods disclosed herein allow a receiver to lock onto an incoming data signal of unknown frequency without reliance on power-hungry external reference clocks or frequency detection circuits. The invention advantageously provides a purely digital solution that does not require additional clock phases and that does not interfere with receiver analog front-end (AFE) implementation.

Figure 1:
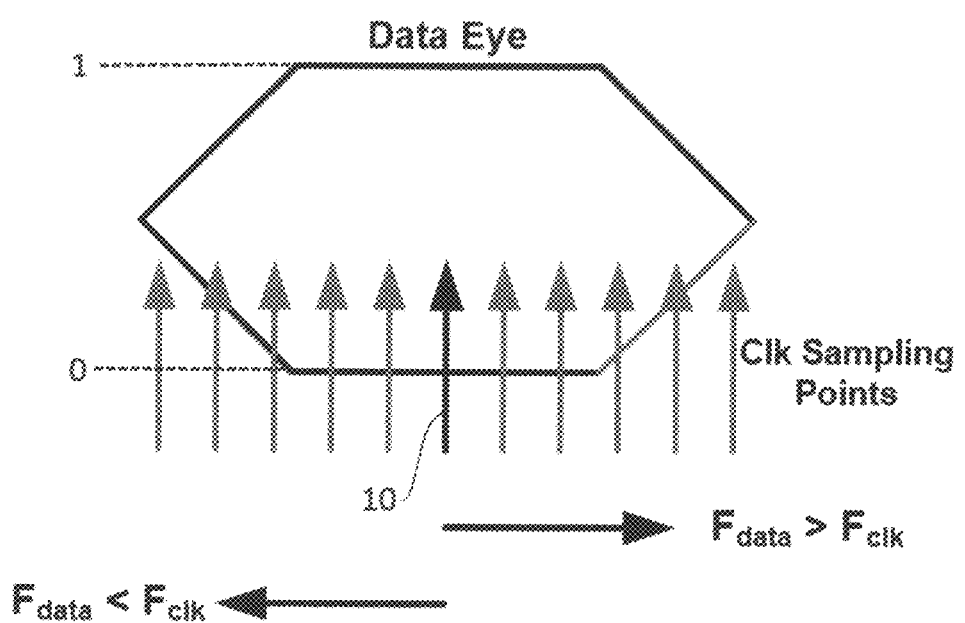
FIG. 1 is an eye diagram illustrating sampling points of a data signal drifting right or left of an ideal sampling point when clock frequency is less than or greater than the data frequency.
Figure 2:
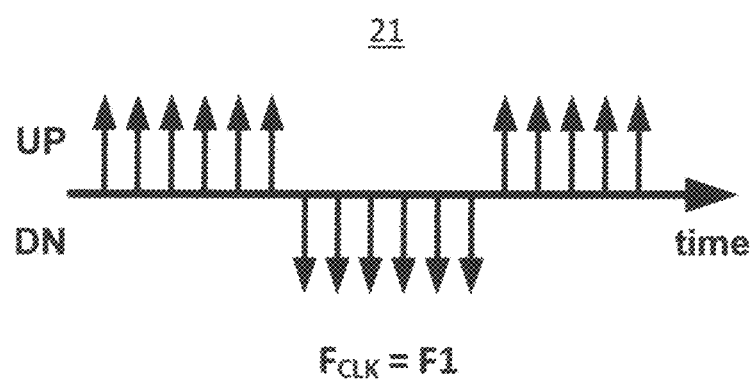
FIG. 2 is a graph of phase detector output when clock frequency is relatively close to the data frequency.
Figure 3:
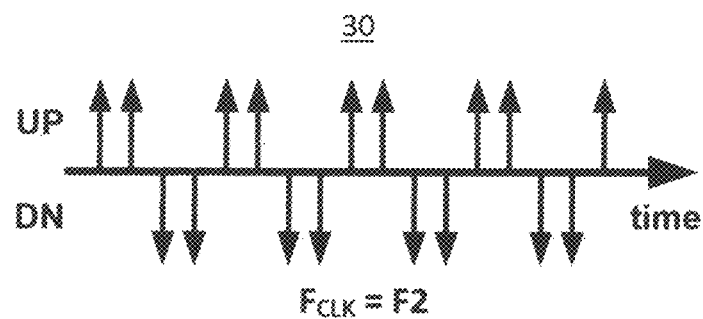
FIG. 3 is a graph of phase detector output when clock frequency is relatively far from the data frequency.

Methods and systems for referenceless frequency acquisition disclosed herein exploit phenomena illustrated in FIGS. 2 and 3. These exemplary figures show graphs of the output of a phase detector (PD) that is sampling a data signal received, for example, in an analog front end (AFE) portion of a receiver circuit. The data signal is transmitted at a data frequency $F_{data}$. The PD samples the data signal at a clock frequency $F_{clk}$=F1 or F2.

The graph 21 of FIG. 2 shows the output of the PD for a clock frequency $F_{clk}$=F1 that is relatively close to the data frequency $F_{data}$. The number of consecutive up (UP) or down (DN) signals generated by the PD provides a relative indication of the rate of data eye traversal. In graph 21, the relatively large number of consecutive UP and DN signals results from a slow rate of data eye traversal due to $F_{clk}$ being relatively close to $F_{data}$. In graph 30 of FIG. 3, the output of the PD is shown for a clock frequency $F_{clk}$=F2 which is relatively far from the data frequency $F_{data}$. In this case, a relatively low number of consecutive UP or DN signals are generated by the PD, indicating a faster rate of data eye traversal. Graphs 21 and 30 thus illustrate the phenomenon that, the closer $F_{clk}$ is to $F_{data}$, the greater number of consecutive UP or DN signals will be output by the PD as the sample points traverse the data eye. The phenomenon is analogous to the generation of beat frequencies that arise when tuning one frequency to another, where each beat is represented by a transition from an UP pulse to a DN pulse. Thus, the closer $F_{clk}$ is to $F_{data}$, the lower the beat frequency; and the farther $F_{clk}$ is from $F_{data}$, the higher the beat frequency.

Figure 4:
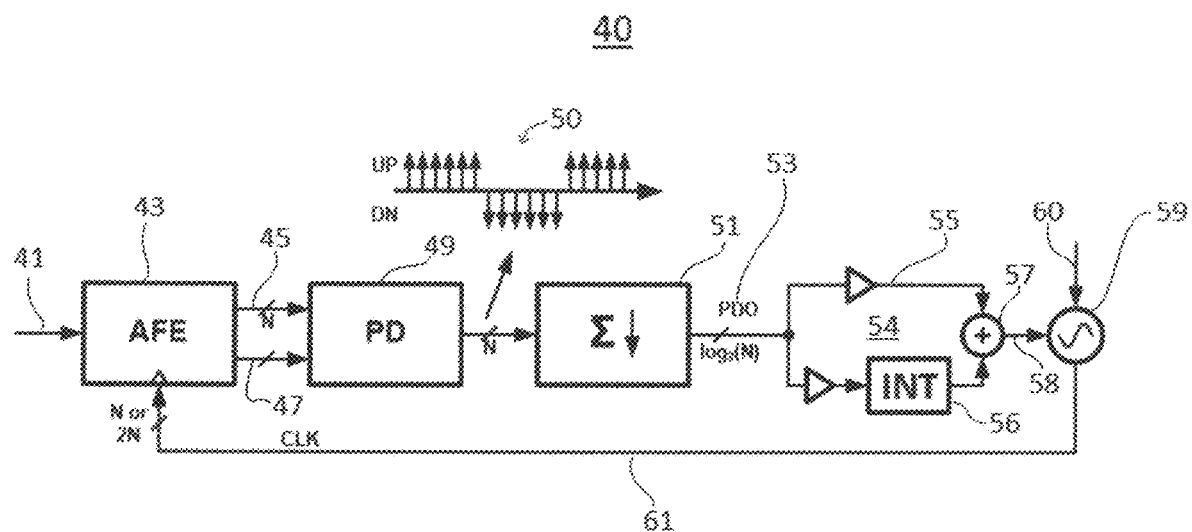
FIG. 4 is a block diagram of one embodiment of a system according to the invention of a referenceless frequency acquisition system in a normal mode of operation.

FIG. 4 shows a block diagram of one embodiment of a system 40 according to the invention for referenceless frequency acquisition in a normal mode of operation. System 40 may have general application in either an analog CDR scheme or in an ADC-based implementation. In one embodiment, the components of system 40 shown in block form represent portions of an integrated circuit that form a CDR loop for a transceiver circuit configured for NRZ or PAM4 applications and operable for signal frequencies up to 25 GHz or higher. Preferably, but not necessarily, the components of system 40 may be integrated on a single microchip using known fabrication techniques.

In system 40, an incoming data signal 41 is received at an analog front end (AFE) 43 of the circuit. Signal 41 is an analog signal of unknown frequency and may be modulated, for example, with data symbols. AFE 43 is configured to deserialize the data into N parallel lower-rate data streams 45 (where N is an integer). For example, a signal 41 received at 25 GHz may be deserialized into N=8 parallel data streams 45, each having a frequency of around 3.125 GHz. The AFE 41 thereby advantageously reduces the data rate to facilitate circuit design for downstream digital signal processing without loss of data. The AFE 41 may also generate an error signal 47 that indicates to a downstream phase detector 49 whether sampled pulses of the signal 41 should be interpreted as UP signals or DN signals. Techniques for generating the error signal 47 are well know in the science of CDR loop design, and any known technique may be employed here. For example, the error signal may be generated using a scheme that samples in both a main clock phase and in another clock phase that is 180 degrees apart from the main clock phase. The PD 49 may then compare the samples taken at these two clock phases to determine whether the clock frequency is leading or lagging the data frequency. In another example, the error signal may be generated by comparing the level of a sampled signal to a reference level to determine whether the clock frequency should be increased or decreased, in which case, the error signal can be generated in a single clock phase. As a function of the data 45 and error 47 signals, PD 49 generates an output 50 that has the form of N parallel symbol streams of UP and DN signals.

The next downstream processing block is the accumulate-and-dump block 51. Here, the N parallel symbol streams are summed together for a fixed number of clock cycles, the total is generated, then the symbol streams are summed together again for another fixed number of clock cycles, another total is generated, and so on. The output signal 53 therefore comprises a lower-rate, narrower width signal. Signal 53 is also referred to herein as the phase detector output (PDO) 53. In an exemplary operation of the accumulate-and-dump block 51, let N=8, and let an UP signal have a value of +1 and let a DN signal have a value of −1. In this example, the 8 outputs from PD 49 are summed together at block 51 and signal 53 may be represented as a 4-bit output, which includes one additional bit for the sign. In this example, there are N streams of two bits each since +1/−1 needs a 2-bit representation.

In system 40, the signal 53 is fed to a digital looping path 54, which consists of a proportional feedback path 55 and an integral feedback path 56. The output signals of paths 55 and 56 are summed at stage 57, and the summed output 58 of stage 57 drives a digitally controlled oscillator (DCO) 59. The DCO 59 has a coarse tuning input 60, which is configured to drive the DCO 59 at a selected one of multiple frequencies that occur at regular intervals throughout a relatively wide frequency band. For example, if DCO 59 covers 10 GHz band, the coarse tuning input 60 can be used to split the 10 GHz band into one hundred evenly spaced 100 MHz bands. In this example the DCO 59 can be tuned by the coarse tuning input 60 to one of the 100 MHz bands to provide a coarse estimate 61 of the clock frequency. In general, the accuracy of the clock frequency 61 may be improved by feedback of the updated estimate of the clock signal to AFE 43. When the average value of the output signal 53 approaches zero, higher accuracy is achieved.

Figure 5:
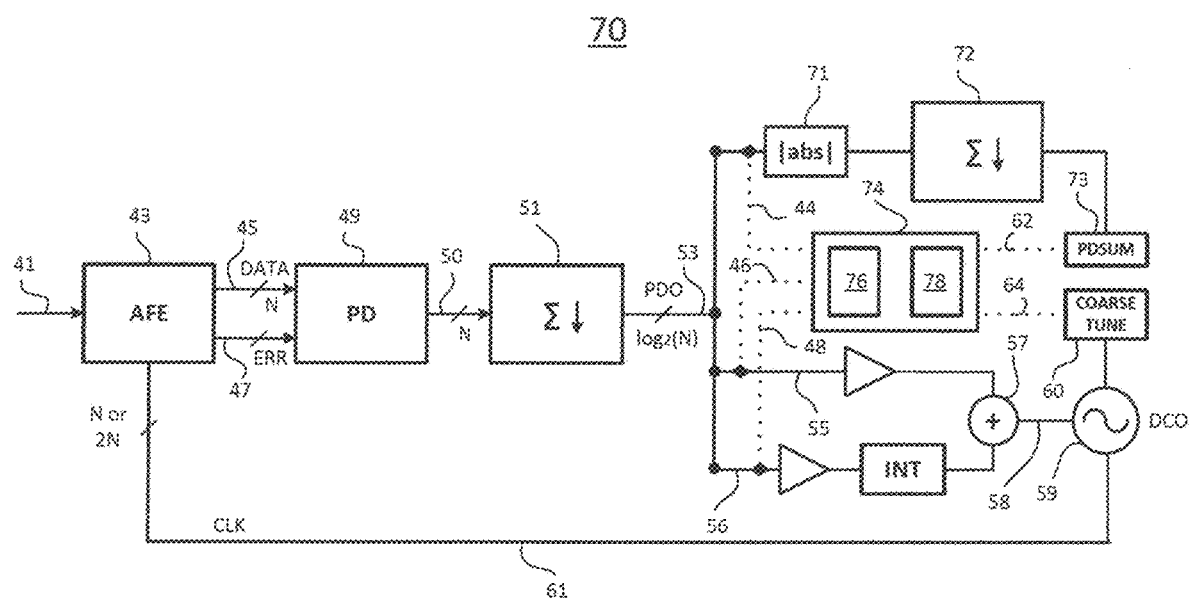
FIG. 5 is a block diagram of another embodiment of a system according to the invention of a referenceless frequency acquisition system.

FIG. 5 shows a block diagram of another embodiment according to the invention of a referenceless frequency acquisition system 70. System 70 includes functional blocks similar to those of system 40, and may be fabricated in a manner similar to the manner of fabrication of system 40. System 70 is characterized by an additional circuit portion, also referred to herein as the PDSUM generating loop, that is coupled to the output node of the accumulate-and-dump block 51. The PDSUM generating loop consists of an absolute value module 71, a second accumulate-and-dump block 72, and an output signal of block 72 labeled PDSUM. The PDSUM generating loop of system 70 provides a purely digital implementation for a CDR scheme. Advantageously, a system 70 equipped with a PDSUM generating loop according to the present invention may be implemented without interfering with design or operation of the AFE portion 43, and may be implemented without the use of additional clock phases for sampling.

In system 70, the PDO signal 53 is fed to the absolute value module 71, which computes an absolute value of a sum of a predetermined number of UP or DN signals. For example, if the sampling window is four consecutive pulses, i.e. 4 UP/DN signals, and each pulse has a value of +1, then the possible sums are +4, +2, 0, −2, and −4. The computed absolute values of those sums would be, respectively, +4, +2, 0, +2, and +4. The absolute values of the sums are then passed from block 71 to the accumulate-and-dump block 72. Block 72 is configured to sum up the absolute values received from block 71 and generate a total value PDSUM at output 73.

Figure 6:
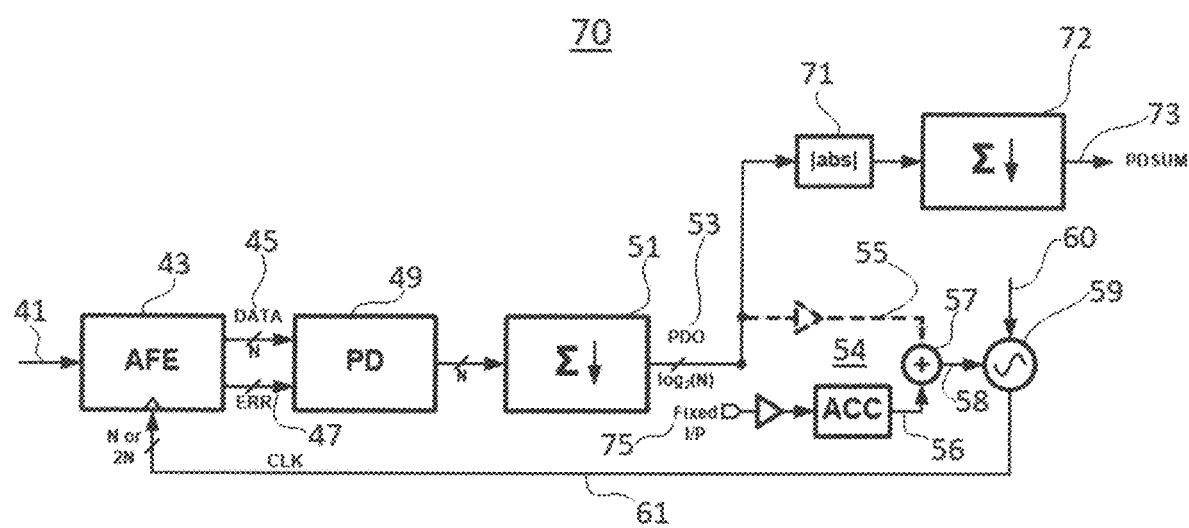
FIG. 6 is the block diagram of FIG. 5 modified to illustrate a first configuration of a system used to perform a method according to the invention in which the proportional feedback path is switched off and in which the integral path is driven with a fixed code.

System 70 is further characterized by a controller 74 that is coupled in electronic communication to the PDSUM generating loop via control path 44, to the proportional feedback loop 55 via control path 46, and to the integral feedback loop 56 via control path 48. Controller 74 may include a dedicated microprocessor 76 and memory 78. In one embodiment, the microprocessor 76 and memory 78 may be individual components electrically connected to, but physically separated from the microchip that houses the components of system 70. In other embodiments, microprocessor 76 and memory 78 may be formed on the same microchip that houses the components of system 70. Memory 78 may include any form or combination of read only, read/write, volatile, and nonvolatile memory suitable for purposes of realizing the functional requirements of the invention. Controller 74 is also coupled in electronic communication to the PDSUM output 73 via data path 62, and to the coarse tune input 60 via data path 64. The control paths 44, 46, 48 allow the controller 74 to switch on or off, or drive signals to, any of, or any portion(s) of, the feedback loops 55, 56 and the PDSUM generating loop, according to algorithms stored in memory 78 that are executable by the microprocessor 76. FIGS. 6, 8, 10 and 12 illustrate several exemplary configurations of system 70 achieved by the controller 74 executing such algorithms in support of performing processing steps of the present invention. In all of FIGS. 6, 8, 10, and 12, the controller 74 is coupled to system 70 as shown in FIG. 6; however, for purposes of illustrating salient aspects of the invention, the controller 74 and its processor and memory are not shown in those figures although those components are present and operating in the background.

FIG. 6 shows the block diagram of FIG. 5 modified to illustrate a first configuration of system 70 in a method for referenceless frequency acquisition according to the invention. In the first configuration, the proportional feedback path 55 is switched off, and the integral feedback path is driven with a fixed code 75. For example, the integral feedback path may be driven with a nominal 0 input, so that the VCO control voltage lies at or near the midpoint the supply. Disconnection of the proportional feedback path 55 is indicated by the dashed lines in the figure. In this first configuration of the system, the code from the coarse tuning input 60 to the DCO 59 is swept in steps from a minimum frequency to a maximum frequency. At each code of input frequency, the PDSUM generating loop of system 70 accumulates the absolute value of the PDO signal 53 for a fixed number of cycles, then sums the absolute values at block 72 and outputs a total value PDSUM 73. For example, in one embodiment, the fixed number of cycles may be about $2^{13}$ cycles. In general, where there exists a large number of consecutive UP or DN signals at the output 50 from PD 49, there will be correspondingly larger values accumulated by the PDSUM generating loop and, accordingly, larger values for the PDSUM. The PDSUM total calculated for each fixed number of clock cycles is stored, i.e. in readable memory, resulting in a PDSUM total for each code of input frequency. According to the invention, when the sweep from minimum to maximum frequency is completed, the PDSUM totals may be compared, and the maximum PDSUM total may be determined. The DCO coarse tuning input 60 may then be set to the code that corresponds to the maximum PDSUM total. This code is a first, coarse estimate of the unknown data frequency, and may be referred to herein as the first critical value. Preferably, system 70 in the first configuration operates in an open loop scheme to achieve the coarse estimate, in that the calculated values of PDSUM totals 73 are stored in memory for comparison, and not fed directly to the coarse tune input 60.

Figure 7:
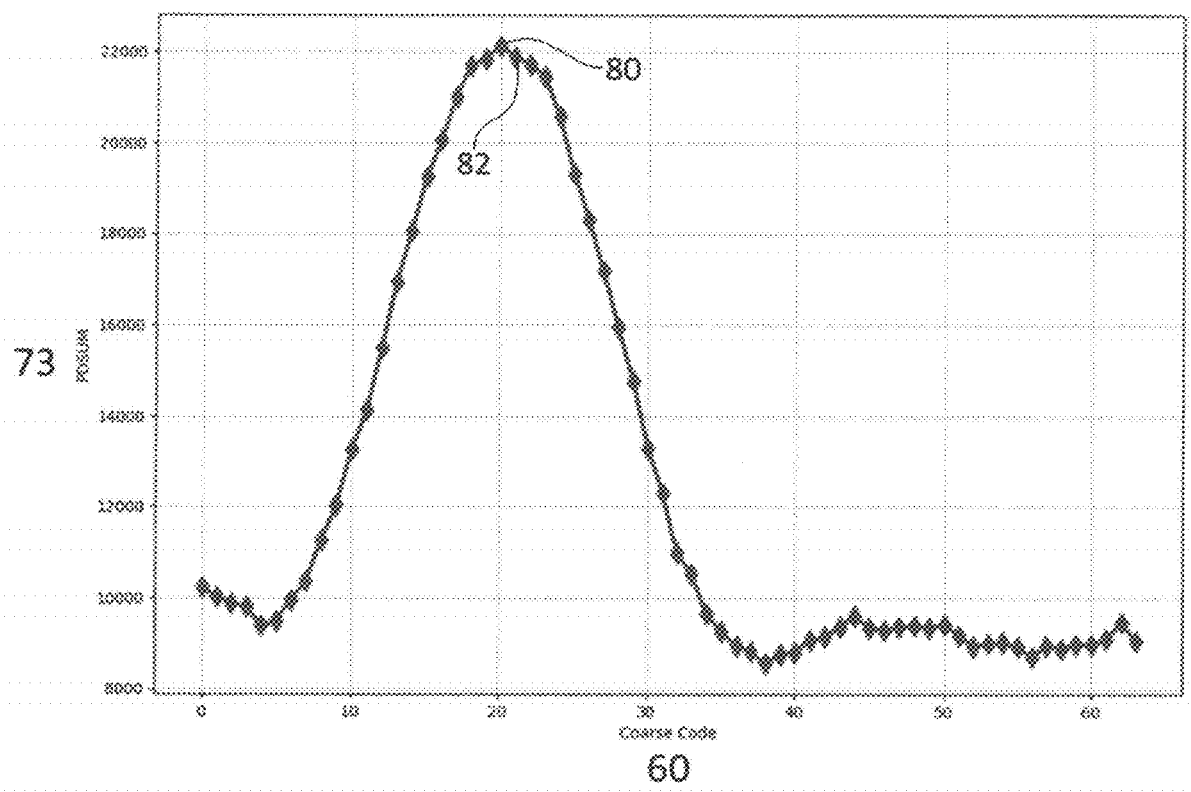
FIG. 7 is a graph of PDSUM values as a function of coarse code representing an estimate of data frequency, as generated by a system modeled as in FIG. 6, wherein each PDSUM value is a sum of absolute values of digital sums of symbol streams, and where the symbol streams represent required phase updates for a DCO.

FIG. 7 is a graph of PDSUM values 73 as a function of coarse code 60. Each coarse code 60 on the horizontal axis represents an estimate of data frequency, as generated by a system 70 as modeled as in FIG. 6. Each PDSUM value 73 is a sum of absolute values of digital sums of symbol streams generated at block 72. Each of the coarse codes 60 may set the DCO frequency to a different value. Ideally, the coarse code 60 that is selected is a coarse code 60 that corresponds to a critical PDSUM value 73 that represents a closest estimate of data frequency. A critical PDSUM value may be, for example, a maximum value among of the distribution of PDSUM values. In the graph of FIG. 7, a critical PDSUM value at point 80 occurs for a coarse code of 20, which corresponds to a maximum PDSUM value equal to about 22,000 units. Coarse code 20 thus represents a closest estimation of the data frequency. In general, a critical PDSUM value is any value having a characteristic indicative of a close estimation of data frequency. Point 80 provides a critical value in the graph of FIG. 7 because its PDSUM value is the maximum value among all other PDSUM values generated by coarse codes tested in the same sampling window. Note that the adjacent point 82, which corresponds to a coarse code value of 22, has a PDSUM value less than 22,000 units. In this graph, the sampling window spans across coarse codes from 0 to 65 units at sampling increments of about once every unit.

Figure 8:
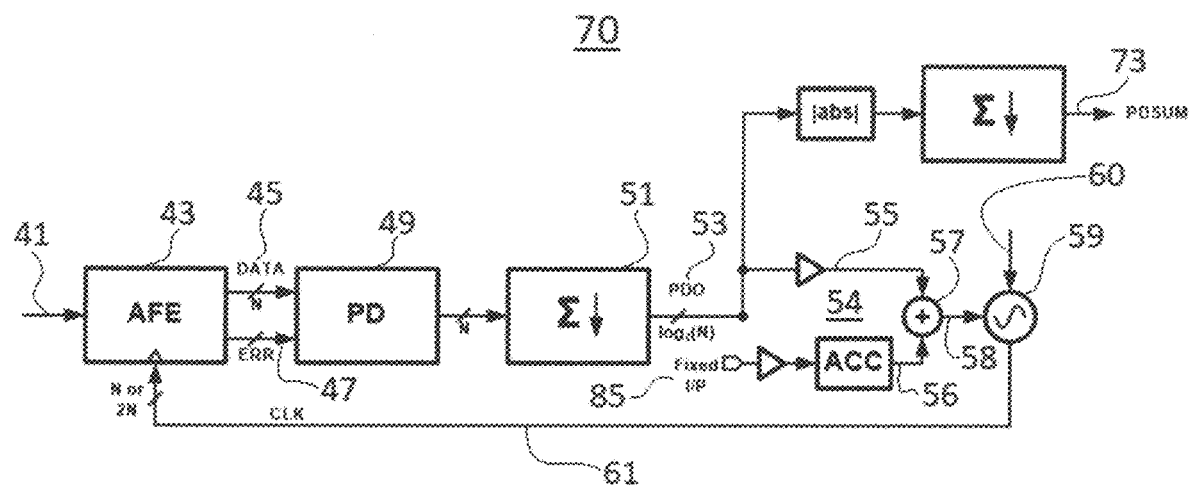
FIG. 8 is the block diagram of FIG. 6 modified to illustrate a second configuration of a system used to perform a method according to the invention in which the proportional feedback path is switched on while the integral path is driven with a fixed code.

FIG. 8 shows the block diagram of FIG. 5 modified to illustrate a second configuration of system 70 in a method for referenceless frequency acquisition according to the invention. In the second configuration, the proportional feedback path 55 is switched on while the integral path 56 is driven with a fixed code 85. Fixed code 85 may be identical to fixed code 75, or it may differ from fixed code 75. When the proportional feedback loop 55 is closed, it is possible to identify critical PDSUM values as something other than maximum values. For example, a maximum value of a first or second order derivative of the PDSUM sequence can indicate a coarse code that closely approaches the data frequency.

Switching system 70 to the second configuration is appropriate when the frequency of DCO 59 closely approaches the unknown data frequency, for example, within about 100 ppm. With the proportional feedback path 55 switched on, the feedback signal 58 will begin to force the DCO output 61 to the data frequency, resulting in a sudden increase in the PDO 53. The coarse tune input 60 may then be swept in finer increments over a smaller sampling window above and below a coarse code value that corresponds to a critical PDSUM value to produce a closer estimate of the data frequency. This process of achieving closer coarse estimates of the data frequency may be repeated for a number of cycles or iterations, with each cycle or iteration detecting a critical PDSUM value, identifying the corresponding coarse code, reducing the sampling window about the corresponding coarse code, sweeping coarse codes in finer increments within the sampling window, detecting a new critical PDSUM value, etc. Each such critical PDSUM value determined with system 70 set to the second configuration may be referred to as a second critical value.

Figure 9:
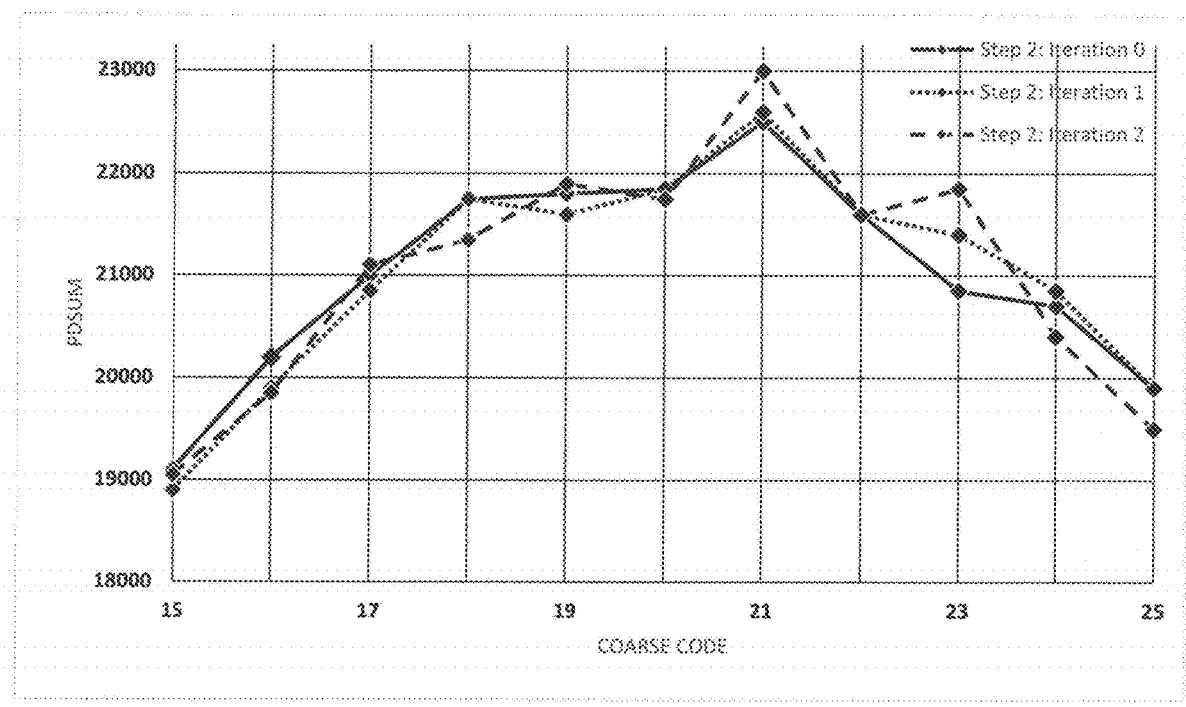
FIG. 9 is a graph of PDSUM values as a function of coarse code representing an estimate of data frequency, as generated by a system modeled as in FIG. 8, showing results from multiple iterations superimposed.

FIG. 9 shows a graph of PDSUM values 73 as a function of coarse codes 60 that represent an estimate of data frequency, as generated by a system modeled as in FIG. 8. The graph shows results from multiple iterations superimposed. Multiple iterations may be desirable to resolve errors introduced by random phenomena that can affect the fidelity of the data signal 41. The graph illustrates that greater accuracy can be achieved by reducing the sampling window around a coarse code estimate generated from a prior iteration, and sweeping coarse codes above and below that estimate in finer increments. Here, the sampling window spans coarse codes from 14 to 26 units. The results reveal a finer estimate of the data frequency at point 84, which corresponds to a critical PDSUM value of 23,000 units. Note that point 84 lies between points 80 and 82, and was passed over during a prior sweep that used a wider sampling interval.

Figure 10:
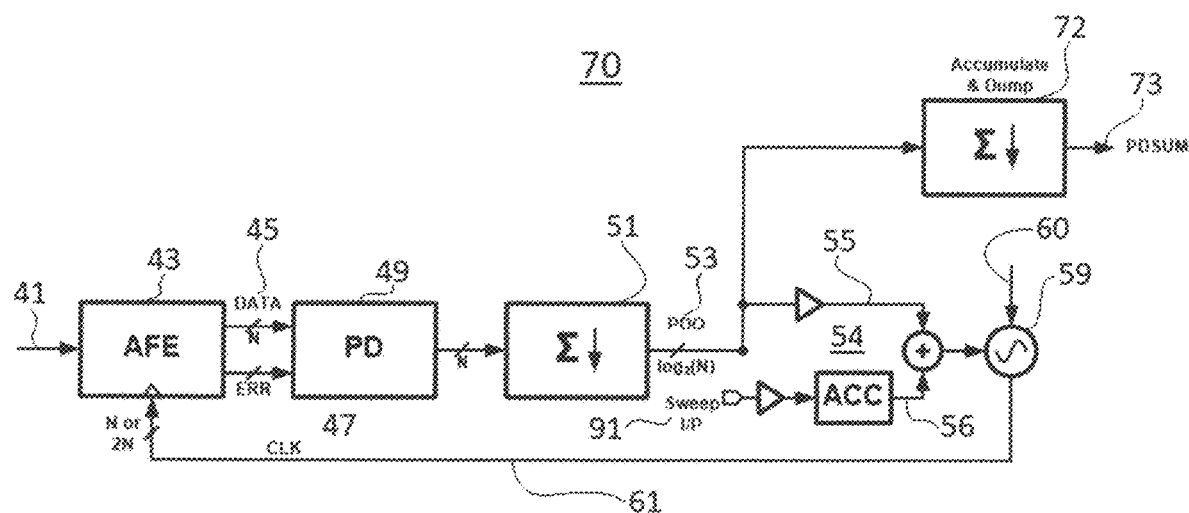
FIG. 10 is the block diagram of FIG. 6 modified to illustrate a third configuration of a system used to perform a method according to the invention in which the proportional feedback path is switched on while the integral path is driven with a variable code to achieve a finer estimate of the data frequency.

FIG. 10 shows the block diagram of FIG. 6 modified to illustrate a third configuration of system 70 in a method for referenceless frequency acquisition according to the invention. In the third configuration, the proportional feedback path 55 is switched on while the integral path 56 is driven with a variable code 91 to achieve a finer estimate of the data frequency. The closest coarse estimate of data frequency that was generated using the second configuration of system 70 is used to drive DCO 59 at the coarse tune input 60. Input 91 to integral path 56 is now swept in fine steps. Whereas coarse tuning for the second configuration of system 70 was done by sweeping in coarse steps, e.g. around 100 MHz steps, the fine tuning for the third configuration is performed using much finer incremental steps, e.g., around 10 MHz steps. In addition, when fine tuning in the third configuration, the absolute value module 71 is not used, and may simply be bypassed in the CDR circuit. This is because, as the estimates begin to approach the data frequency very closely, the phase detector 49 will output long sequences of positive pulses between beat frequencies and so the sum of the PDO signals 53 provides a satisfactory indication without having to compute absolute values.

With system 70 so configured, the PDSUM 73 output values are generated and the resulting series of PDSUM 73 values are analyzed to determine a point in the series where the sign of the PDSUM values changes, i.e. from plus to minus or vice versa. The consecutive PDSUM values that exhibit the change in sign are critical PDSUM values, as this is an indication of the variable integral path code crossing the data frequency. A critical value determined in the third configuration of system 70 may be referred to as the third critical value. In another embodiment, the third critical value is the finest approximation of data frequency achieved by locking DCO 59 to a code value that lies between codes that correspond to the consecutive PDSUM values that have opposite signs. In another embodiment, the third critical value is the finest approximation of data frequency achieved by locking the DCO 59 to a code value that corresponds to either of the consecutive PDSUM values. In an alternative embodiment, using the third configuration of system 70, absolute values may be generated for the PDSUM values 73 so that consecutive PDSUM values having opposite signs appear as adjacent positive peaks. The DCO 59 may then be locked to a code value that corresponds to a PDSUM value between the adjacent positive peaks. In another embodiment, the third critical value may be determined according to $f[n-1]=abs(v[n]-2*v[n-1]+v[n-2])$, wherein the DCO is set to $code=(N1+N2)/2$, and where N1 and N2 are the two largest values of function $f[n]$.

Figure 11:
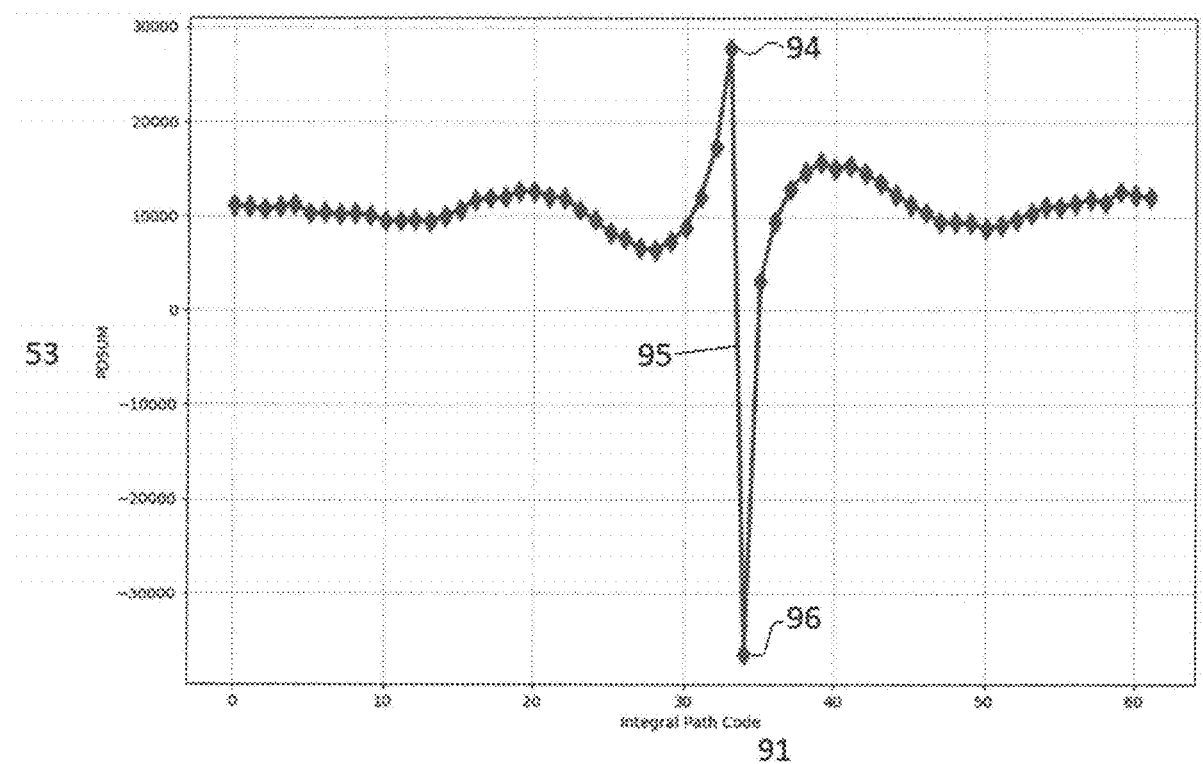
FIG. 11 is a graph of PDSUM values as a function of integral path code representing fine estimates of data frequency, as generated by a system modeled as in FIG. 10.

FIG. 11 shows a graph of PDSUM values 53 as a function of integral path code 91 representing fine estimates of data frequency, as generated by a system modeled as in FIG. 10. The critical PDSUM value occurs near the integral path code of 32. To the far left or far right of 32, the frequency difference is relatively large, and so the CDR output is not reliable. As the integral path code approaches the data frequency near 32, the CDR output becomes more reliable, pointing to the correct sign of frequency error. As a result, when the data frequency is crossed, the CDR output changes from a highly positive value at point 94 to highly negative value at point 96. This also results in a large second derivative value of the PDSUM curve about the critical value. Accordingly, the critical value may be determined as a value that occurs at a midpoint 95 between consecutive integral path codes of different signs (positive or negative) of PDSUM values.

Figure 12:
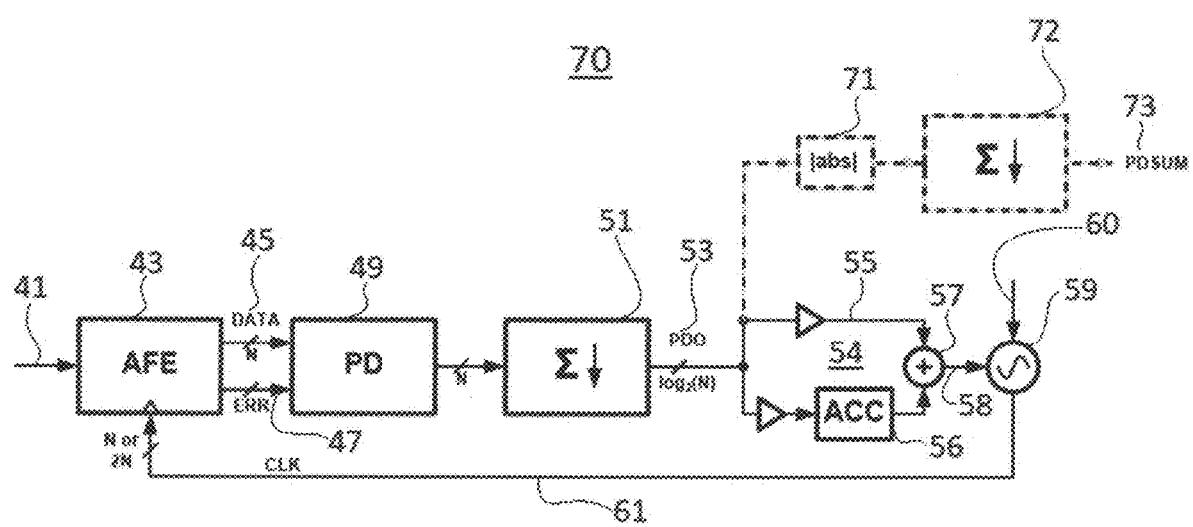
FIG. 12 is the block diagram of FIG. 6 modified to illustrate a fourth configuration of a system used to perform a method according to the invention in which normal operation is restored by switching off the PDSUM generating loop.

FIG. 12 shows the block diagram of FIG. 6 modified to illustrate a return of system 70 to a state of normal operation in a method for referenceless frequency acquisition. The state of normal operation, which is functionally identical to the state of system 40 depicted in FIG. 4, is achieved by switching off the PDSUM generating loop coincident with locking the DCO 59 to the data frequency. Accordingly, the PDSUM generating loop is shown in dashed lines, indicating that it has been removed from the CDR circuit, or has otherwise been rendered inactive. The DCO 59 is locked to the data frequency by setting it initially to the code corresponding to the critical PDSUM value that was determined while operating in the third configuration of system 70.

Because DCO 59 is being driven within the locking range of the CDR loop of system 40, this allows the normal phase-locking functionality of the CDR loop to keep the clock and data frequency synchronized.

Advantageously, systems and methods of the present invention lock onto an unknown data frequency acquired by a receiver without having to modify any of the circuitry that is present in the AFE area of the receiver. This avoids increasing the cost and complexity of the AFE, both in terms of fabrication costs and power consumption, to incorporate frequency acquisition functionality that operates for relatively short periods of time.

As described above and depicted in FIGS. 6, 8, 10, and 12, certain portions of the circuit of system 70 are switched on and off during performance of methods of the invention for referenceless frequency acquisition. To effect and control the switching on, switching off, bypassing, activating, or deactivating of various portions of the circuit, system 70 may be configured with a controller 74 that includes control logic stored in firmware or memory 78 as code executable by the microprocessor 76 according to methods known in the art. For example, the control logic may be configured to (a) enable and bypass the absolute value stage, (b) connect and disconnect the proportional feedback path, (c) disconnect and drive the integral feedback path, (e) store and compare sums generated by the second summing stage, and (f) command the DCO to set a clock frequency.

In a more elaborate embodiment of the system for referenceless frequency acquisition, the control logic may be further configured to perform the following functions: obtain a coarse estimate of the unknown data frequency by disconnecting the proportional feedback path, driving the integral feedback path with a fixed code, commanding the DCO to apply a first range of test clock frequencies to the system, and determining the coarse estimate as code corresponding to a first critical output of the second summing stage, obtain a fine estimate of the unknown data frequency by reconnecting the proportional feedback path, driving the integral feedback path with a fixed code, commanding the DCO to apply a second range of test clock frequencies to the system, where the second range includes the coarse estimate, and determining the fine estimate as code corresponding to a second critical output of the second summing stage, and lock the clock frequency to the data frequency by applying the fine estimate to the feedback input, bypassing the absolute value stage, driving the integral feedback path with a third range of test clock frequencies, and setting the clock frequency to the test clock frequency corresponding to a third critical output of the second summing stage.

Figure 13:
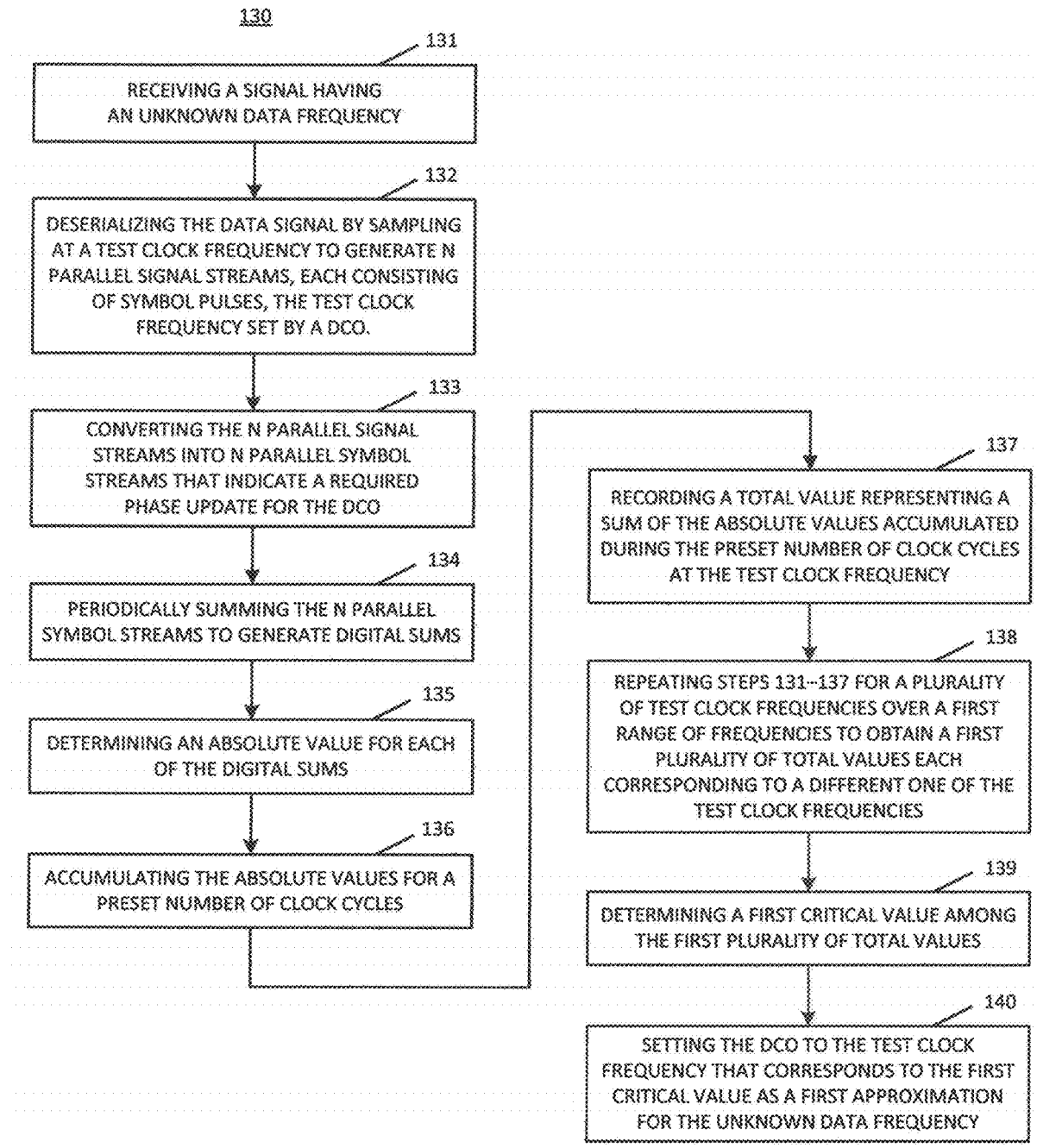
FIG. 13 is a process flow chart illustrating salient steps in a method according to one embodiment of the invention for referenceless frequency acquisition.

FIG. 13 shows a process flow chart illustrating salient steps in a method 130 according to one embodiment of the invention for referenceless frequency acquisition. The steps may be executed automatically, for example, by the hardware and software structures described in various embodiments of the invention disclosed above. Method 130 begins at step 131, at which a signal having an unknown data frequency is received. Next, in step 132, the received data signal is deserialized by sampling at a test clock frequency to generate N parallel signal streams. Each parallel signal stream so generated may consist of symbol pulses. The test clock frequency may be set by a DCO. In the next step 133, the N parallel signal streams are converted into N parallel symbol streams that indicate a required phase update for the DCO. Then, in step 134, the N parallel symbol streams are periodically summed to generate digital sums. In step 135, an absolute value is determined for each of the digital sums. Then in step 136, the absolute values determined in step 135 are accumulated for a present number of clock cycles. In the next step 137, method 130 records a total value representing a sum of the absolute values accumulated during the preset number of clock cycles at the test clock frequency.

Step 138 represents a repetition of steps 131-137, in the order shown, for a plurality of test clock frequencies over a first range of frequencies to obtain a first plurality of total values. Each total value so obtained corresponds to a different one of the test clock frequencies. After the repetition of steps 131-137, the method proceeds to step 139. In step 139, a first critical value is determined from among the first plurality of total values. In the final step 140, the DCO is set to the test clock frequency that corresponds to the first critical value, to provide a first approximation for the unknown data frequency.

Figure 14:
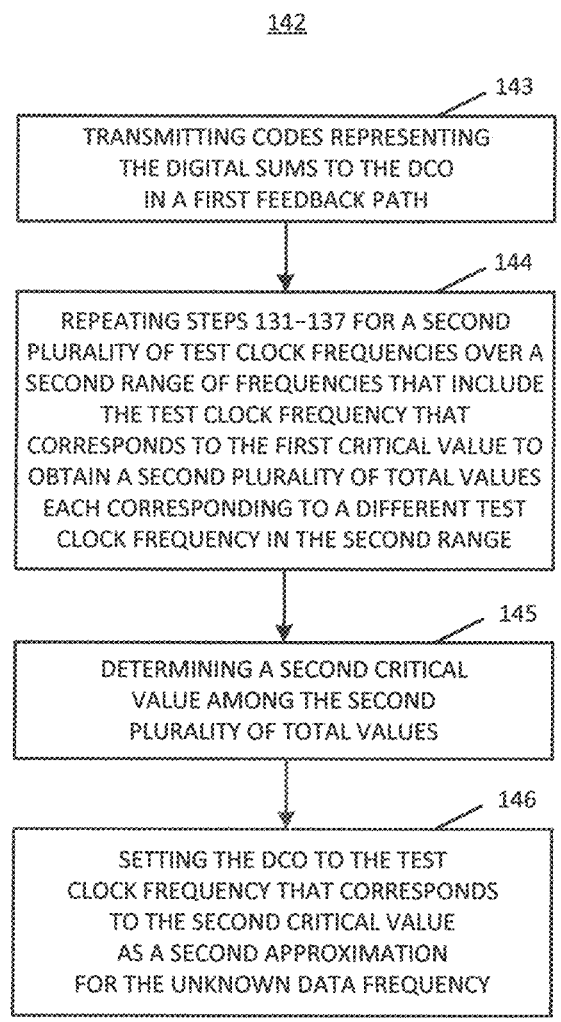
FIG. 14 is a process flow chart illustrating additional steps in a method according to the invention for referenceless frequency acquisition.

FIG. 14 shows a process flow chart illustrating additional steps of a method 142 according to the invention. Method 142 can supplement the process of method 140 for referenceless frequency acquisition to obtain a finer estimate of an unknown data frequency. The supplemental steps start at step 143, at which codes representing the digital sums from step 134 are transmitted to the DCO in a first feedback path. Next, step 144 is executed, which represents a repetition of steps 131-137. These seven steps are repeated for a second plurality of test clock frequencies over a second range of frequencies that include the test clock frequency that corresponds to the first critical value. This action obtains a second plurality of total values, each corresponding to a different test clock frequency in the second range of frequencies. Next, in step 145, a second critical value is determined from among the second plurality of total values. In the final step 146, the DCO is set to the test clock frequency that that corresponds to the second critical value as a second, and finer approximation for the unknown data frequency.

Figure 15:
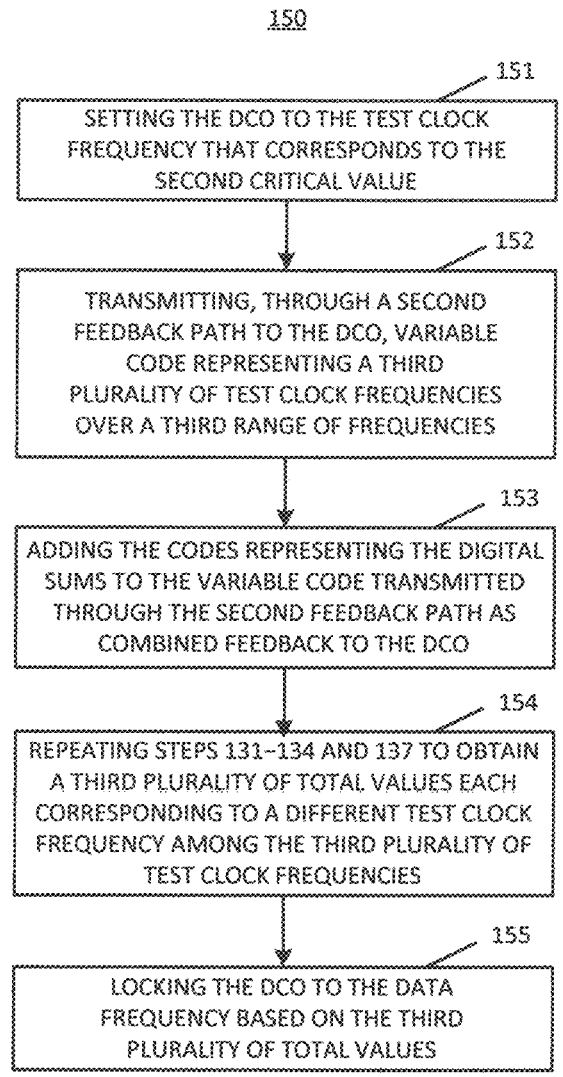
FIG. 15 is a process flow chart illustrating additional steps in a method according to the invention for referenceless frequency acquisition.

FIG. 15 shows a process flow chart illustrating additional steps in a method 150 according to the invention. Method 150 can supplement the process of method 142 for referenceless frequency acquisition to obtain an even finer estimate of an unknown data frequency. The supplemental steps of method 150 begin at step 151, in which the DCO is set to the test clock frequency that corresponds to the second critical value obtained in step 145. Next, step 152 provides for transmitting, through a second feedback path to the DCO, variable code representing a third plurality of test clock frequencies over a third range of frequencies. Next, in step 153, the codes representing the digital sums are added to the variable code transmitted through the second feedback path as combined feedback to the DCO. Next, step 154 is executed, which represents a repetition of steps 131-134 and 137. These five steps are repeated to obtain a third plurality of total values each corresponding to a different test clock frequency among the third plurality of test clock frequencies. In the final step 155, the DCO is set to the data frequency based on a characteristic of the third plurality of total values. For example, the characteristic may be consecutive codes corresponding to sums having opposite signs, and the DCO may be set to code corresponding to either of the oppositely signed consecutive codes, or to a code that lies between the oppositely signed consecutive codes. At this finest level of estimation, setting the DCO essentially locks the DCO to the data frequency.

The foregoing disclosure presents embodiments of the invention that use three configurations of the CDR loop of system 70 to produce coarse, fine, and finer estimates for data frequency. Other embodiments of the invention are possible wherein a single configuration of the CDR loop is used to produce all coarse, fine, and finer estimates. Other embodiments of the inventions are also possible wherein a first configuration of the CDR loop is used to obtain a coarse estimate, and a second configuration of the CDR loop is used to obtain one or more additional, finer estimates. Still other embodiments are possible in which estimates of the data frequency are obtained by generating successively finer approximations using one, two, or all three of the configurations, or any combination of configurations from among the three, including combinations in which any one of the configurations is used one or more times in consecutive or nonconsecutive iterations.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for referenceless frequency acquisition in a clock and data recovery system, comprising:
    a digitally controlled oscillator (DCO) having a coarse tuning input and a feedback input and providing a clock frequency for the system;
    a receiver configured to receive a data signal of unknown frequency and convert the data signal into N deserialized outputs;
    a phase detector configured to convert the N deserialized outputs into N symbol streams each consisting of a series of phase updates;
    a first summing stage configured to periodically sum together the N symbol streams to generate a lower rate sum;
    an absolute value stage configured to compute an absolute value for each lower rate sum generated by the first summing stage;
    a second summing stage configured to periodically sum absolute values computed by the absolute value stage;
    a feedback loop coupled between a third summing stage and the output of the first summing stage, the third summing stage configured to combine feedback signals from both paths and couple the combined feedback signal to the feedback input; and
    control logic configured to (a) enable and bypass the absolute value stage, (b) connect and disconnect the feedback loop, (c) store and compare sums generated by the second summing stage, and (d) command the DCO to set a clock frequency.

2. The system of claim 1 wherein the phase updates are selected from the group consisting of early, late, and hold.

3. The system of claim 1, wherein the feedback loop comprises a proportional feedback path and an integral feedback path, and wherein the control logic is further configured to
    (g) obtain a coarse estimate of the unknown data frequency by disconnecting the proportional feedback path, driving the integral feedback path with a fixed code, commanding the DCO to apply a first range of test clock frequencies to the system, and determining the coarse estimate as code corresponding to a first critical output of the second summing stage.

4. The system of claim 3 wherein the first critical output is a maximum output among outputs from the second summing stage.

5. The system of claim 4, wherein the second critical output is a maximum output among outputs from the second summing stage.

6. The system of claim 3, wherein the control logic is further configured to:
    (h) obtain a fine estimate of the unknown data frequency by reconnecting the proportional feedback path, driving the integral feedback path with a fixed code, commanding the DCO to apply a second range of test clock frequencies to the system, the second range including the coarse estimate, and determining the fine estimate as code corresponding to a second critical output of the second summing stage.

7. The system of claim 6, wherein the control logic is further configured to:
    (i) lock the clock frequency to the data frequency by applying the fine estimate to the feedback input, driving the integral feedback path with a third range of test clock frequencies, and setting the clock frequency to the test clock frequency corresponding to a third critical output of the second summing stage.

8. The system of claim 7, wherein the test clock frequency that corresponds to the third critical output lies between consecutive codes that correspond to sums having opposite signs.

* * * * *